United States Patent
Ogasahara (10) Patent No.: US 9,722,697 B2
(45) Date of Patent: Aug. 1, 2017

(54) POLARIZATION DIVISION MULTIPLEXING OPTICAL COMMUNICATION RECEPTION DEVICE, POLARIZATION DIVISION MULTIPLEXING OPTICAL COMMUNICATION SYSTEM, AND POLARIZATION DIVISION MULTIPLEXING OPTICAL COMMUNICATION METHOD

(71) Applicant: NEC Corporation, Minato-ku, Tokyo (JP)

(72) Inventor: Daisaku Ogasahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 61 days.

(21) Appl. No.: 14/761,371

(22) PCT Filed: Jan. 17, 2014

(86) PCT No.: PCT/JP2014/000215
§ 371 (c)(1),
(2) Date: Jul. 16, 2015

(87) PCT Pub. No.: WO2014/115519
PCT Pub. Date: Jul. 31, 2014

(65) Prior Publication Data
US 2015/0358078 A1  Dec. 10, 2015

(30) Foreign Application Priority Data
Jan. 22, 2013  (JP) ................ 2013-008900

(51) Int. Cl.
*H04B 10/079* (2013.01)
*H04B 10/60* (2013.01)
(Continued)

(52) U.S. Cl.
CPC ....... *H04B 10/07953* (2013.01); *H04B 10/60* (2013.01); *H04B 10/614* (2013.01); *H04B 10/6166* (2013.01); *H04J 14/06* (2013.01)

(58) Field of Classification Search
CPC . H04J 14/06; H04J 14/02; H04J 14/00; H04B 10/61; H04B 10/613;
(Continued)

(56) References Cited

U.S. PATENT DOCUMENTS

| 2003/0002112 A1* | 1/2003 | Hirano ............ H04B 10/25133 398/147 |
| 2012/0039607 A1* | 2/2012 | Ogasahara ......... H04B 10/6971 398/65 |

(Continued)

FOREIGN PATENT DOCUMENTS

| WO | 2010/026894 A1 | 3/2010 |
| WO | 2010/140289 A1 | 12/2010 |

(Continued)

OTHER PUBLICATIONS

International Search Report for PCT Application No. PCT/JP2014/000215, mailed on Feb. 10, 2014.

(Continued)

*Primary Examiner* — Don N Vo (57) ABSTRACT

A polarization demultiplexing optical communication receiver is provided with a signal quality change imparting means which imparts a signal quality change to multiplexed two optical signals; and a signal quality monitoring means which compares signal qualities of the two optical signals with each other after the multiplexed two optical signals imparted with the signal quality change are subjected to polarization separation so as to specify the two optical signals based on a result of the comparison. This makes it possible to reduce transmission characteristics degradation of a polarization-multiplexed optical signal, and to implement transmission having high reliability.

16 Claims, 5 Drawing Sheets

(51) Int. Cl.
*H04J 14/06* (2006.01)
*H04B 10/61* (2013.01)

(58) Field of Classification Search
CPC ............ H04B 10/2569; H04B 10/6161; G02B 6/12004; G02B 6/2773
USPC .......................................................... 398/25
See application file for complete search history.

(56) References Cited

U.S. PATENT DOCUMENTS

2014/0064345 A1* 3/2014 Sugitani ............ H04L 25/03038
375/224
2014/0328585 A1* 11/2014 Arikawa .............. H04B 10/616
398/25

FOREIGN PATENT DOCUMENTS

| WO | 2012/105070 A1 | 8/2012 |
| WO | 2012/132374 A1 | 10/2012 |
| WO | 2013/125176 A1 | 8/2013 |
| WO | 2013/136652 A1 | 9/2013 |

OTHER PUBLICATIONS

English translation for Written opinion of PCT Application No. PCT/JP2014/000215.

* cited by examiner

POLARIZATION DIVISION MULTIPLEXING OPTICAL COMMUNICATION RECEPTION DEVICE, POLARIZATION DIVISION MULTIPLEXING OPTICAL COMMUNICATION SYSTEM, AND POLARIZATION DIVISION MULTIPLEXING OPTICAL COMMUNICATION METHOD

This application is a National Stage Entry of PCT/JP2014/000215 filed on Jan. 17, 2014, which claims priority from Japanese Patent Application 2013-008900 filed on Jan. 22, 2013, the contents of all of which are incorporated herein by reference, in their entirety.

TECHNICAL FIELD

The present invention relates to a polarization demultiplexing optical communication technique, and more particularly, to a polarization demultiplexing optical communication receiver, a polarization demultiplexing optical communication system, and a polarization demultiplexing optical communication method for implementing transmission having high reliability.

BACKGROUND ART

In view of a rapid increase in the traffic amount of a backbone network due to the spread of the Internet, there is a strong demand for implementing an ultra-high-speed long-distance optical communication system exceeding 100 Gbps. As a technique for implementing such an ultra-high-speed long-distance optical communication system, an optical phase modulation method utilizing a digital signal processing technique and a polarization demultiplexing technique are paid attention to.

The polarization demultiplexing technique is such that in an optical transmitter, two independent optical signals, whose frequency bands of carrier waves are the same as each other and whose polarization states are orthogonal to each other, are multiplexed. Further, the polarization demultiplexing technique is a technique such that in an optical receiver, the two independent optical signals are separated from a receiving signal so as to increase the transmission speed by two times. Combining the polarization demultiplexing technique, and a technique utilizing an optical phase modulation method such as QPSK (Quadrature Phase Shift Keying) makes it possible to implement an ultra-high-speed long-distance optical communication system as fast as 100 Gbps. A technique such that a process of compensating for an optical carrier wave frequency deviation and an optical phase deviation, and a polarization separation process of separating a signal into two independent optical signals are implemented by a digital signal processing circuit mounted on an LSI (Large Scale Integration) or the like for high-precision demodulation is called an optical digital coherent communication method.

Further, NPL 1 discloses a technique such that in a polarization demultiplexing optical communication system using an optical phase modulation method and a polarization demultiplexing technique, optical noise resulting from a nonlinear optical effect on an optical signal during optical fiber transmission is reduced. The technique disclosed in NPL 1 imparts time-wise optical phase changes different from each other with respect to two independent optical signals in an optical transmitter so as to compensate for the imparted time-wise optical phase changes in an optical receiver. This makes it possible to reduce optical noise resulting from a nonlinear optical effect generated between two independent optical signals, and to enhance the transmission characteristics.

CITATION LIST

Non Patent Literature

[NPL 1] S. Fujisawa, T. Nakano, D. Ogasahara, E. Le Taillandier de Gabory, Y. Inada, T. Ito, and K. Fukuchi, "Demonstration of the Mitigation of Intra-Channel Non-linearities based on Inter-Polarization Digital Frequency Offsetting with 50 Gb/s PM-QPSK signal over 10,080 km transmission" European Conference and Exhibition on Optical Communication Technical Digest, Page Mo. 1. C. 2, Jun. 16, 2012.

SUMMARY OF INVENTION

Technical Problem

The technique described in NPL 1 can be further enhanced by adding the following effects. Specifically, an object of the technique is to enable to specify which one of the two independent optical signals to be output after polarization separation processing in the optical receiver is one of the two independent optical signals generated in the optical transmitter. This makes it possible to securely specify the amounts of time-wise optical phase changes imparted to polarization-separated optical signals, and to securely compensate for the time-wise optical phase changes. Thus, it is possible to securely execute a process of compensating for an optical carrier wave frequency deviation and an optical phase deviation, and to securely restore a bit string.

In an optical receiver, the following method is generally used as a method for specifying two independent optical signals that have been subjected to polarization separation. Specifically, the method is such that in an optical transmitter, specific bit strings (training patterns) different from each other are inserted into the respective optical signals, and the optical signals are identified, based on a result of collating the specific bit strings included in a bit string restored in an optical receiver. This method, however, is not appropriate when it is impossible or difficult to accurately restore a bit string.

Further, in this case, the number of combinations of setting a compensation amount for time-wise optical phase change is at most two. There is a method such that the two combinations are tried one by one for determining whether an optical signal is accurately demodulated, based on judgment whether the specific bit strings inserted in advance in the optical signal in an optical transmitter can be successfully extracted in an optical receiver. This method, however, requires a large amount of time for implementing the whole process. Therefore, this method is not appropriate when recovery from a fault within such a short time as several ten milliseconds is strongly demanded e.g. when a path is switched in cutting off an optical fiber.

In view of the above problem, an object of the invention is to specify which one of two independent optical signals to be output after polarization separation processing in an optical receiver of a polarization demultiplexing optical communication system is one of two independent optical signals generated in an optical transmitter. This provides a polarization demultiplexing optical communication receiver, a polarization demultiplexing optical communication system, and a polarization demultiplexing optical communication method that secure high reliability.

Solution to Problem

A polarization demultiplexing optical communication receiver of the invention is a polarization demultiplexing optical communication receiver for receiving multiplexed two optical signals whose polarization states are orthogonal to each other and whose frequency bands of carrier waves are the same as each other for polarization separation. The polarization demultiplexing optical communication receiver is provided with a signal quality change imparting means which imparts a signal quality change to the multiplexed two optical signals; and a signal quality monitoring means which compares signal qualities of the two optical signals with each other after the multiplexed two optical signals imparted with the signal quality change are subjected to the polarization separation so as to specify the two optical signals based on a result of the comparison.

A polarization demultiplexing optical communication system of the invention is provided with a polarization demultiplexing optical communication transmitter which multiplexes two optical signals whose polarization states are orthogonal to each other and whose frequency bands of carrier waves are the same as each other for transmission; and a polarization demultiplexing optical communication receiver which receives the multiplexed two optical signals for polarization separation. The polarization demultiplexing optical communication receiver is provided with a signal quality change imparting means which imparts a signal quality change to the multiplexed two optical signals; and a signal quality monitoring means which compares signal qualities of the two optical signals with each other after the multiplexed two optical signals imparted with the signal quality change are subjected to the polarization separation so as to specify the two optical signals based on a result of the comparison.

A polarization demultiplexing optical communication method of the invention is a polarization demultiplexing optical communication method in which two optical signals whose polarization states are orthogonal to each other and whose frequency bands of carrier waves are the same as each other are multiplexed for transmission, and the multiplexed two optical signals are received for polarization separation. The polarization demultiplexing optical communication method includes: imparting a signal quality change to the received multiplexed two optical signals; and comparing signal qualities of the two optical signals with each other after the multiplexed two optical signals imparted with the signal quality change are subjected to the polarization separation so as to specify the two optical signals based on a result of the comparison.

Advantageous Effects of Invention

According to the invention, it is possible to specify which one of two independent optical signals to be output after polarization separation processing in an optical receiver of a polarization demultiplexing optical communication system is one of two independent optical signals generated in an optical transmitter. This provides a polarization demultiplexing optical communication receiver, a polarization demultiplexing optical communication system, and a polarization demultiplexing optical communication method that secure high reliability.

DESCRIPTION OF EMBODIMENTS

In the following, best exemplary embodiments of the invention are described in detail referring to the drawings. The following exemplary embodiments include technically preferred limitations in order to carry out the invention. However, the technical scope of the invention is not limited to the following exemplary embodiments.

First Exemplary Embodiment

Figure 1:
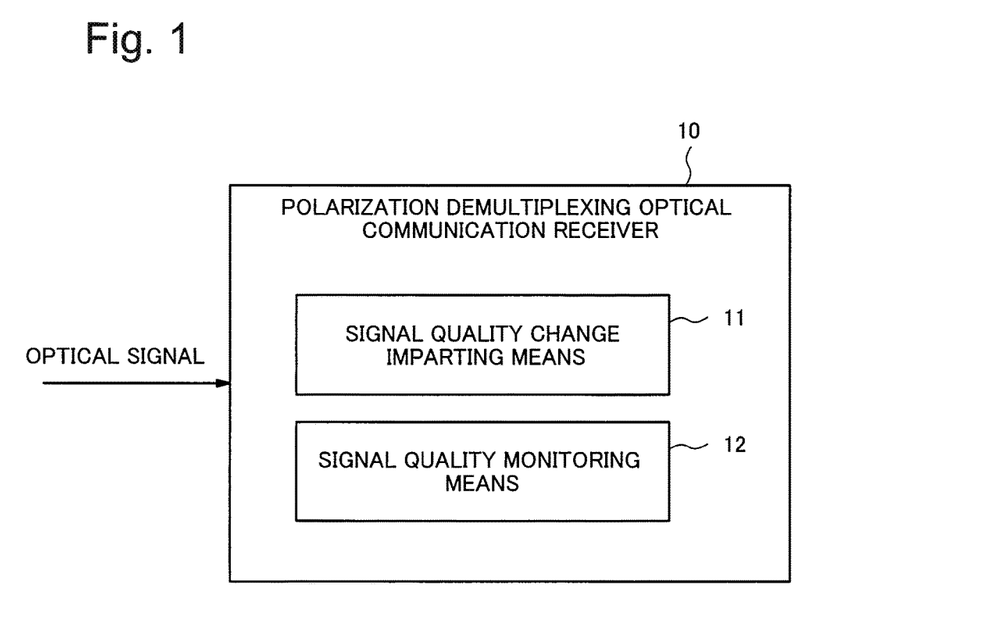
FIG. 1 is a block diagram illustrating a configuration of a polarization demultiplexing optical communication receiver in a first exemplary embodiment of the invention.

The first exemplary embodiment of the invention is described in detail referring to a drawing. FIG. 1 is a block diagram illustrating a configuration of a polarization demultiplexing optical communication receiver 10 in the exemplary embodiment.

The polarization demultiplexing optical communication receiver 10 is a polarization demultiplexing optical communication receiver configured such that multiplexed two optical signals, whose polarization states are orthogonal to each other and whose frequency bands of carrier waves are the same as each other, are received for polarization separation. Further, the polarization demultiplexing optical communication receiver 10 is provided with a signal quality change imparting means 11 for imparting a signal quality change to the multiplexed two optical signals. The polarization demultiplexing optical communication receiver 10 is further provided with a signal quality monitoring means for comparing signal qualities of the two optical signals with each other after the multiplexed two optical signals imparted with the signal quality change are subjected to the polarization separation so as to specify the two optical signals, based on a result of the comparison.

According to the exemplary embodiment, it is possible to specify which one of two independent optical signals to be output after polarization separation processing in an optical receiver of a polarization demultiplexing optical communication system is one of two independent optical signals generated in an optical transmitter. This makes it possible to provide a polarization demultiplexing optical communication receiver that secures high reliability.

Second Exemplary Embodiment

Figure 2:
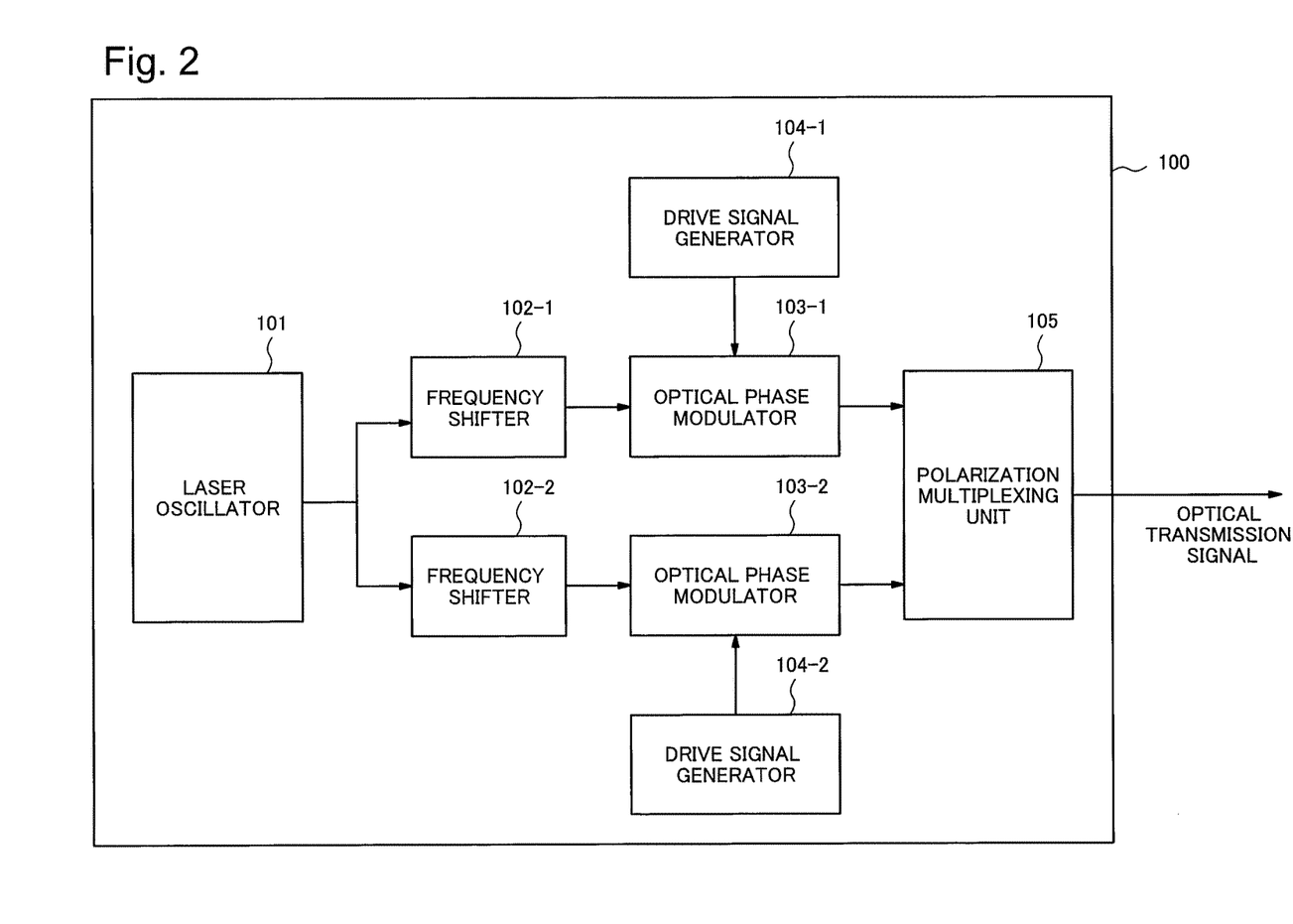
FIG. 2 is a block diagram illustrating a configuration of an optical transmitter of a polarization multiplexing optical communication system in a second exemplary embodiment of the invention.

The second exemplary embodiment of the invention is described in detail referring to the drawings. FIG. 2 is a block diagram illustrating a configuration of an optical transmitter 100 of a polarization multiplexing optical communication system in the exemplary embodiment. The optical transmitter 100 is provided with a laser oscillator 101, frequency shifters 102-1 and 102-2, optical phase modulators 103-1 and 103-2, drive signal generators 104-1 and 104-2, and a polarization multiplexing unit 105.

Laser light serving as a carrier wave oscillated from the laser oscillator 101 is split into two light components. Thereafter, oscillation frequencies of the two light components are shifted by frequencies, whose symbols are different from each other, and whose absolute values are equal to each other, by the frequency shifter 102-1 and by the frequency shifter 102-2, respectively. For instance, when it is assumed that the oscillation frequency of continuous light is fc, and the absolute value of a frequency shift amount is Δf, the optical frequencies of continuous light to be output from the frequency shifter 102-1 and from the frequency shifter 102-2 are respectively fc+Δf and fc−Δf.

The optical phase modulator 103-1 modulates continuous light to be output from the frequency shifter 102-1 by a drive signal generated from a transmission bit string by the drive signal generator 104-1. The operations to be performed by the optical phase modulator 103-2 and by the drive signal generator 104-2 are the same as described above. Two independent optical signals to be output from the optical phase modulators 103-1 and 103-2 are such that the frequency bands of carrier waves are the same as each other. Further, after the two independent optical signals are subjected to polarization multiplexing by the polarization multiplexing unit 105 so that the polarization states of the two independent optical signals are orthogonal to each other, the two independent optical signals are transmitted to an optical transmission path.

Figure 3:
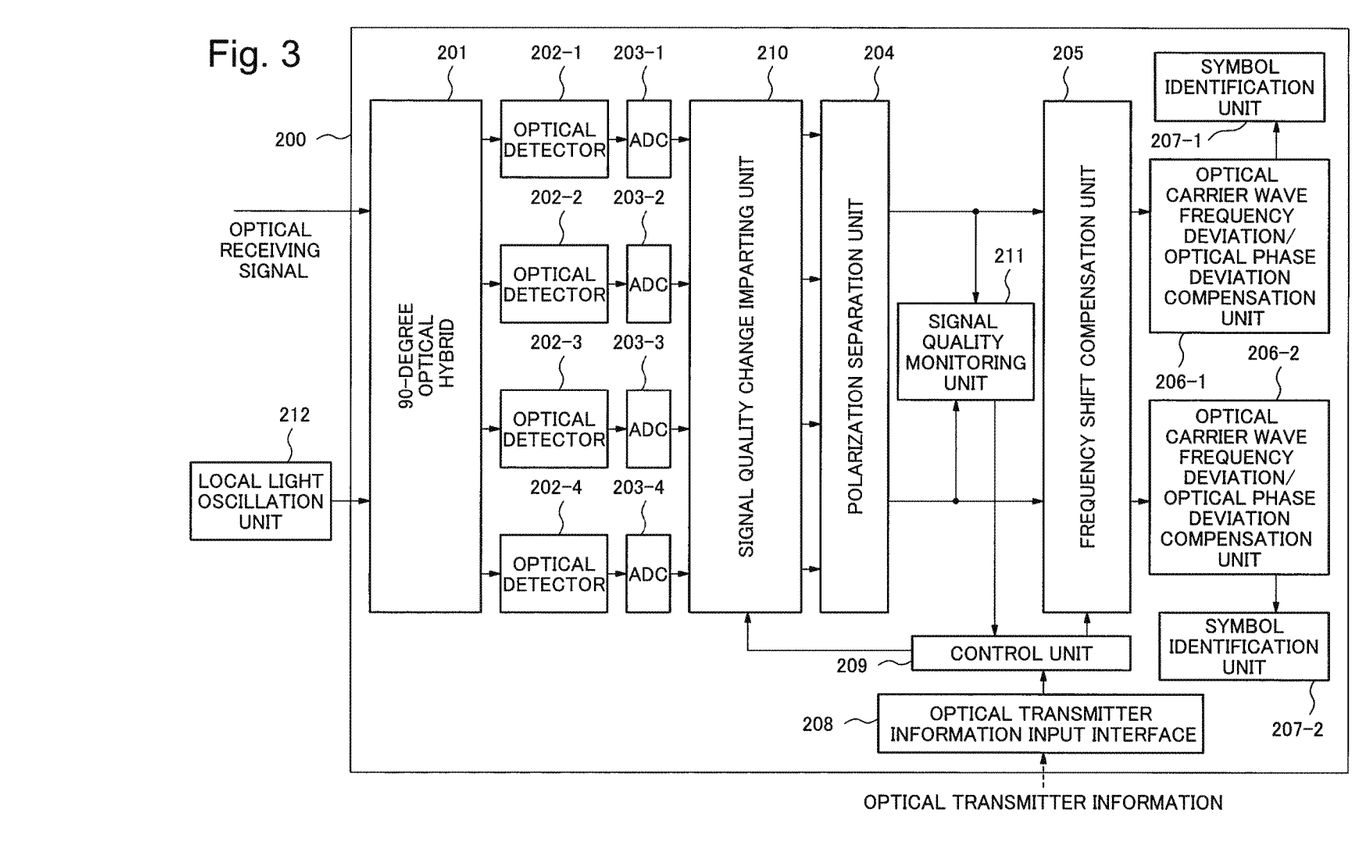
FIG. 3 is a block diagram illustrating a configuration of an optical receiver of the polarization multiplexing optical communication system in the second exemplary embodiment of the invention.

Next, a configuration and an operation of an optical receiver of the polarization multiplexing optical communication system in the exemplary embodiment are described using FIG. 3. FIG. 3 is a block diagram illustrating a configuration of an optical receiver 200 of the polarization multiplexing optical communication system in the exemplary embodiment. The optical receiver 200 is provided with a 90-degree optical hybrid 201, optical detectors 202-1 to 202-4, and ADCs (Analog-to-Digital Converters) 203-1 to 203-4. The optical receiver 200 is further provided with a polarization separation unit 204, a frequency shift compensation unit 205, optical carrier wave frequency deviation/optical phase deviation compensation units 206-1 and 206-2, symbol identification units 207-1 and 207-2, and an optical transmitter information input interface 208. The optical receiver 200 is further provided with a control unit 209, a signal quality change imparting unit 210, and a signal quality monitoring unit 211.

An optical transmission signal transmitted from the optical transmitter 100 is input to the optical receiver 200 (an optical receiving signal). Subsequently, the optical receiving signal is input to the 90-degree optical hybrid 201 together with local oscillation light from a local light oscillation unit 212 having substantially the same oscillation frequency as the laser oscillator 101 for interference. Thereafter, the optical receiving signal is output as four output optical signals from the 90-degree optical hybrid 201. After the optical signals are respectively converted into electrical signals by the optical detectors 202-1 to 202-4, the electrical signals are converted into 4-channel digital signals by the ADC 203-1 to 203-4.

After the optical receiving signal is started to be received in the optical receiver 200, the signal quality change imparting unit 210 just bypasses the 4-channel digital signals and does nothing else until a polarization separation process of the polarization separation unit 204 is stabilized, and transmits the 4-channel digital signals to the polarization separation unit 204. The polarization separation unit 204 performs the polarization separation process using an algorithm such as a CMA (Constant Modulus Algorithm) so as to obtain two independent optical signals from the 4-channel digital signals, and outputs the two independent optical signals as digital signals.

It takes a certain time to stabilize the polarization separation process. The polarization separation process immediately after an optical receiving signal is received is unstable. In view of the above, the signal quality monitoring unit 211 checks that the quality of an optical receiving signal is stabilized from the cost value of a receiving signal to be calculated by the polarization separation unit 204. Specifically, when a polarization separation process of the polarization separation unit 204 is settled, the control unit 209 uses the signal quality change imparting unit 210 to impart quality changes different from each other to two independent optical signals.

For instance, the signal quality change imparting unit 210 is constituted as a filter circuit, and a coefficient of a rectangular filter such that the center frequency of one of the two independent optical signals is a filter center frequency, and the optical spectral bandwidth of the one optical signal is a filter bandwidth is set as the coefficient of the filter circuit. Either one of fc+Δf and fc−Δf, which is calculated from fc and Δf as information of the optical transmitter 100 to be input from the optical transmitter information input interface 208, is used as the value of the filter center frequency. To simplify the description, in this example, it is assumed that the center frequency of the filter is fc+Δf. The filter bandwidth is set to be not smaller than the analog bandwidths of the ADC 203-1 to 203-4 but smaller than the optical spectral bandwidth of an optical signal.

One of the two independent optical signals, specifically, the optical signal fc+Δf, which is cut off and extracted as a main component from the rectangular filter, is input to the polarization separation unit 204. As a result, both of the signal qualities of the output signals fc+Δf and fc−Δf from the polarization separation unit 204 may be degraded. However, the amount of degradation of the optical signal fc+Δf, which is cut off and extracted as a main component, is smaller than the amount of degradation of the optical signal fc−Δf.

Therefore, it is clear that a signal, whose signal quality degradation to be checked by the signal quality monitoring unit 211 is small, is the optical signal imparted with a frequency shift +Δf in the optical transmitter 100, and the other one of the optical signals is the optical signal imparted with a frequency shift −Δf in the optical transmitter 100. Thus, it is possible to use the cost of the polarization separation processing algorithm as an index of signal qualities to be monitored by the signal quality monitoring unit 211.

Specifically, it is possible to use a CMA (Constant Modulus Algorithm), which is an algorithm that defines the distance from a unit circle as a cost, as an algorithm for a polarization separation process. When a polarization multiplexed QPSK signal is subjected to polarization separation, the ideal position of the symbol of the QPSK signal exists on the unit circle. Polarization separation is performed by determining how far the symbol is away from the unit circle, specifically, by assuming that the distance of the symbol from the unit circle is a cost, and updating the internal variable in such a manner as to make the cost zero. The signal quality monitoring unit 211 monitors the cost to thereby determine whether the signal quality degradation is large or small.

After an optical signal imparted with a frequency shift +Δf, and an optical signal imparted with a frequency shift −Δf are specified in the optical transmitter 100, the control unit 209 controls the signal quality change imparting unit 210 to only bypass the signals.

Subsequently, the frequency shift compensation unit 205 compensates for a frequency shift of each of the optical signals, based on a frequency shift amount of each of the two independent optical signals to be output from the polarization separation unit 204, which is notified from the control unit 209. Specifically, the frequency shift compensation unit 205 compensates for the frequency shifts imparted to two independent optical signals by the frequency shifters 102-1 and 102-2 of the optical transmitter 100. The frequency shift amounts are input by e.g. the administrator of the optical communication system, using the optical transmitter information input interface 208.

The optical carrier wave frequency deviation/optical phase deviation compensation units 206-1 and 206-2 compensate for an optical frequency deviation and an optical phase deviation between an optical signal and local oscillation light with respect to each of the two independent optical signals.

The symbol identification units 207-1 and 207-2 respectively determine the symbol with respect to each of the two independent optical signals, which are the output signals from the optical carrier wave frequency deviation/optical phase deviation compensation units 206-1 and 206-2, and then, restore a bit string.

According to the polarization multiplexing optical communication system in the exemplary embodiment as described above, it is possible to specify which one of the two independent optical signals to be output after polarization separation in the optical receiver 200 is one of the two independent optical signals generated in the optical transmitter 100. Thus, it is possible to implement a polarization demultiplexing optical communication receiver, a polarization demultiplexing optical communication system, and a polarization demultiplexing optical communication method that secure high reliability.

Specifically, it is possible to securely specify the amounts of time-wise optical phase changes imparted to polarization-separated optical signals, and to securely compensate for the amounts of time-wise optical phase changes. Therefore, it is possible to securely perform the process of compensating for an optical carrier wave frequency deviation and an optical phase deviation, and to accurately restore a bit string. Thus, it is possible to implement a polarization demultiplexing optical communication receiver, a polarization demultiplexing optical communication system, and a polarization demultiplexing optical communication method that enable to reduce transmission characteristics degradation due to phase noise resulting from a nonlinear optical effect on a polarization-multiplexed optical signal, and to secure high reliability.

Comparative Example

Figure 5:
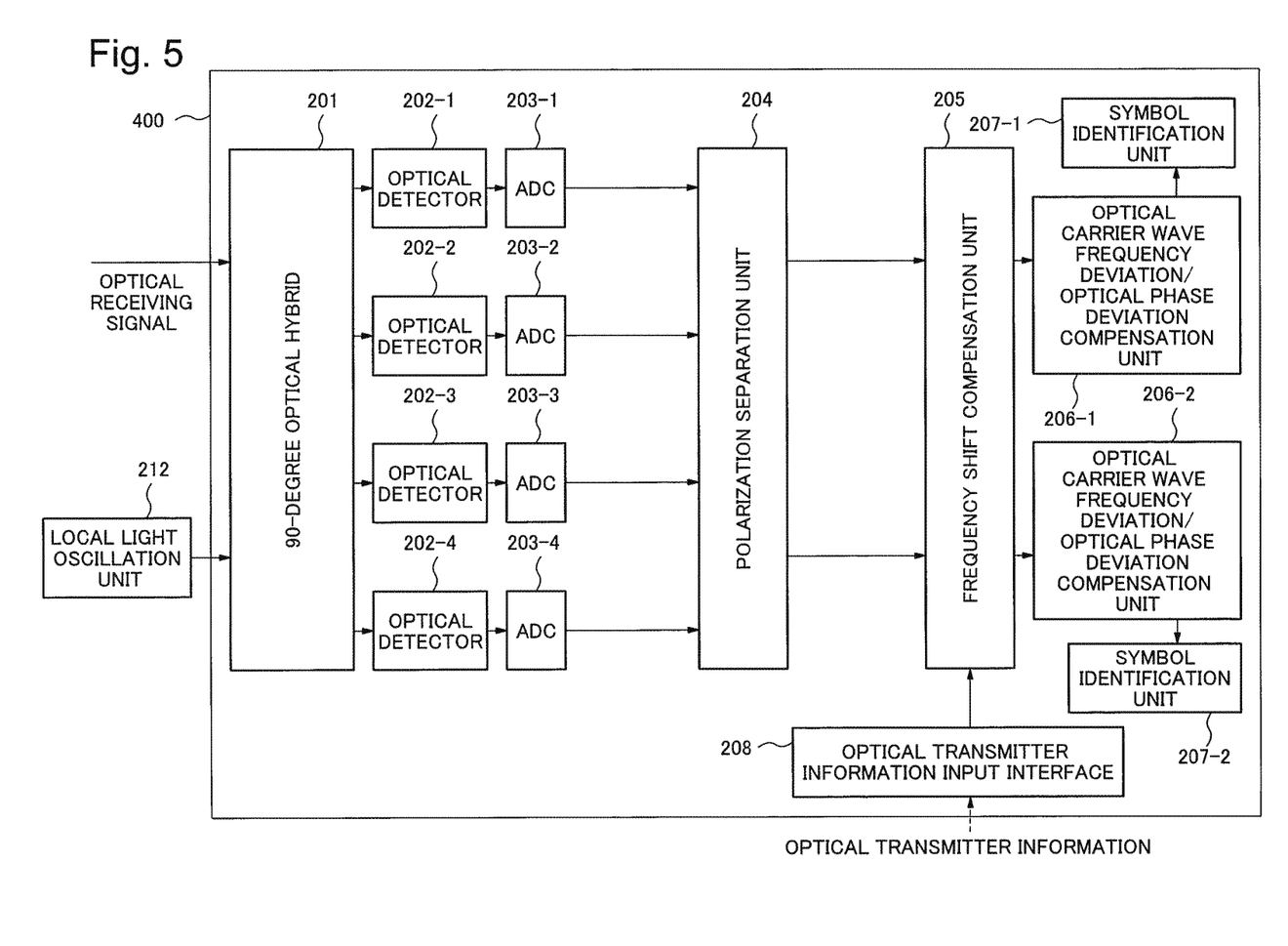
FIG. 5 is a block diagram illustrating a configuration of an optical receiver of a polarization multiplexing optical communication system as a comparative example.

A configuration and an operation of an optical receiver of a polarization multiplexing optical communication system as a comparative example of the second exemplary embodiment of the invention are described using FIG. 5.

FIG. 5 is a block diagram illustrating a configuration of an optical receiver 400 as a comparative example. The optical receiver 400 is provided with a 90-degree optical hybrid 201, optical detectors 202-1 to 202-4, and ADCs (Analog-to-Digital Converters) 203-1 to 203-4. The optical receiver 400 is further provided with a polarization separation unit 204, a frequency shift compensation unit 205, optical carrier wave frequency deviation/optical phase deviation compensation units 206-1 and 206-2, symbol identification units 207-1 and 207-2, and an optical transmitter information input interface 208.

An optical transmission signal transmitted from an optical transmitter (e.g. the optical transmitter 100 in the second exemplary embodiment) is input to the optical receiver 400 (an optical receiving signal). Subsequently, the optical receiving signal is input to the 90-degree optical hybrid 201 together with local oscillation light from a local light oscillation unit 212 having substantially the same oscillation frequency as the laser oscillator 101 for interference. Thereafter, the optical receiving signal is output as four output optical signals from the 90-degree optical hybrid 201. After the optical signals are respectively converted into electrical signals by the optical detectors 202-1 to 202-4, the electrical signals are converted into 4-channel digital signals by the ADCs 203-1 to 203-4.

The polarization separation unit 204 performs a polarization separation process using an algorithm such as a CMA (Constant Modulus Algorithm) so as to obtain two independent optical signals from the 4-channel digital signals, and outputs the two independent optical signals as digital signals.

The frequency shift compensation unit 205 compensates for the frequency shifts imparted to the two independent optical signals by the frequency shifters 102-1 and 102-2 of the optical transmitter 100. The frequency shift amounts are input by the administrator of the optical communication system using the optical transmitter information input interface 208.

The optical carrier wave frequency deviation/optical phase deviation compensation units 206-1 and 206-2 compensate for an optical frequency deviation and an optical phase deviation between an optical signal and local oscillation light with respect to each of the two independent optical signals.

The symbol identification units 207-1 and 207-2 for identifying the two independent optical signals determine the symbol with respect to each of the output signals from the optical carrier wave frequency deviation/optical phase deviation compensation units 206-1 and 206-2, and then, restore a bit string.

According to the comparative example, Compensating for a frequency shift imparted in the optical transmitter 100 by the frequency shift compensation unit 205 makes it possible to demodulate the frequency shift that may exceed the allowable compensation range of the optical carrier wave frequency deviation/optical phase deviation compensation units 206-1 and 206-2. This makes it possible to implement a polarization multiplexing optical communication system that enables to reduce transmission characteristics degradation due to phase noise resulting from a nonlinear optical effect on a polarization-multiplexed optical signal.

On the other hand, according to the second exemplary embodiment of the invention, in addition to the advantageous effects of the comparative example, it is possible to specify which one of the two independent optical signals to be output after polarization separation processing in the optical receiver is one of the two independent optical signals generated in the optical transmitter. This makes it possible to implement a polarization demultiplexing optical communication receiver, a polarization demultiplexing optical communication system, and a polarization demultiplexing optical communication method that secure high reliability.

Third Exemplary Embodiment

Figure 4:
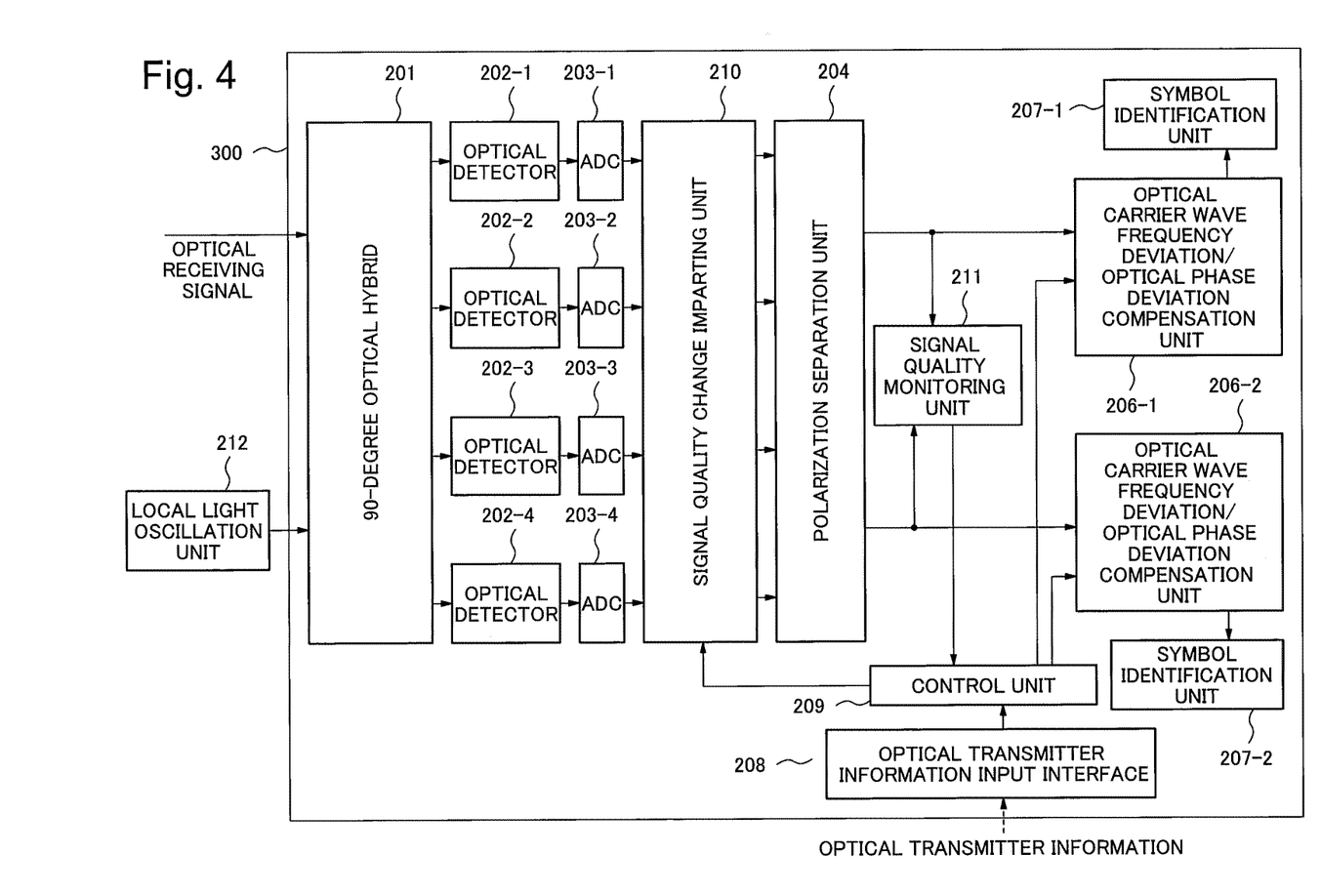
FIG. 4 is a block diagram illustrating a configuration of an optical receiver of a polarization multiplexing optical communication system in a third exemplary embodiment of the invention.

FIG. 4 is a block diagram illustrating a configuration of an optical receiver 300 in the third exemplary embodiment of the invention. The optical receiver 300 in the third exemplary embodiment is different from the optical receiver 200 in the second exemplary embodiment in a point that the optical receiver 300 is not provided with a frequency shift compensation unit 205, and frequency shift amounts are notified from a control unit 209 to optical carrier wave frequency deviation/optical phase deviation compensation units 206-1 and 206-2.

As described in the second exemplary embodiment, the optical carrier wave frequency deviation/optical phase deviation compensation units 206-1 and 206-2 perform a process of compensating for an optical frequency deviation between the center frequency of an optical receiving signal and the oscillation frequency of local oscillation light. The frequency shifts imparted to the optical signals by frequency shifters 102-1 and 102-2 of an optical transmitter 100 are also regarded as a part of the frequency deviation. Therefore, as far as the sum of an optical frequency deviation and a frequency shift amount is within the allowable compensation range of the optical carrier wave frequency deviation/optical phase deviation compensation units 206-1 and 206-2, it is possible to demodulate the optical signals, even without providing a frequency shift compensation unit 205.

When the sum of an optical frequency deviation and a frequency shift amount exceeds the allowable compensation range of the optical carrier wave frequency deviation/optical phase deviation compensation units 206-1 and 206-2, the following process is performed. Specifically, frequency shift amounts are accurately set to initial values of frequency deviation estimation amounts of the optical carrier wave frequency deviation/optical phase deviation compensation units 206-1 and 206-2, based on a specific result of an optical signal to be notified from the control unit 209, and based on a frequency shift amount imparted to each of the optical signals in the optical transmitter 100. According to this configuration, the allowable compensation range of the optical carrier wave frequency deviation/optical phase deviation compensation units 206-1 and 206-2 is equal to a range obtained by adding a frequency shift amount to the initial allowable compensation range. This makes it possible to demodulate an optical signal.

As described above, according to the exemplary embodiment, in addition to the advantages effects of the second exemplary embodiment, it is possible to reduce the circuit scale and to reduce the development cost, because it is not necessary to provide a frequency shift compensation unit 205.

The invention is not limited to the foregoing exemplary embodiments. The invention may be modified in various ways within the scope of the invention as defined in the claims. It is needless to say that such modifications are included in the scope of the invention.

Further, a part or all of the exemplary embodiments may be described as the following Supplemental Notes. The present invention, however, is not limited to the following Supplemental Notes.

Supplemental Notes
(Supplemental Note 1)

A polarization demultiplexing optical communication receiver for receiving multiplexed two optical signals whose polarization states are orthogonal to each other and whose frequency bands of carrier waves are the same as each other for polarization separation, including:

a signal quality change imparting means which imparts a signal quality change to the multiplexed two optical signals; and a signal quality monitoring means which compares signal qualities of the two optical signals with each other after the multiplexed two optical signals imparted with the signal quality change are subjected to the polarization separation so as to specify the two optical signals based on a result of the comparison.

(Supplemental Note 2)

The polarization demultiplexing optical communication receiver according to Supplemental Note 1, wherein the signal quality change imparting means is a filter circuit.

(Supplemental Note 3)

The polarization demultiplexing optical communication receiver according to Supplemental Note 2, wherein the filter circuit has a filter coefficient such that a center frequency of one of the two optical signals is a filter center frequency, and an optical spectral bandwidth of the one optical signal is a filter bandwidth.

(Supplemental Note 4)

The polarization demultiplexing optical communication receiver according to any one of Supplemental Notes 1 to 3, wherein the signal quality change imparting means imparts the signal quality change after the polarization separation is stabilized.

(Supplemental Note 5)

The polarization demultiplexing optical communication receiver according to any one of Supplemental Notes 1 to 4, wherein the signal quality change imparting means bypasses the optical signals after the signal quality monitoring means specifies the two optical signals.

(Supplemental Note 6)

The polarization demultiplexing optical communication receiver according to any one of Supplemental Notes 1 to 5, wherein the signal quality monitoring means compares the signal qualities with each other by a cost of an algorithm for the polarization separation.

(Supplemental Note 7)

A polarization demultiplexing optical communication system, including:

a polarization demultiplexing optical communication transmitter which multiplexes two optical signals whose polarization states are orthogonal to each other and whose frequency bands of carrier waves are the same as each other for transmission; and a polarization demultiplexing optical communication receiver which receives the multiplexed two optical signals for polarization separation, wherein the polarization demultiplexing optical communication receiver is the polarization demultiplexing optical communication receiver according to any one of Supplemental Notes 1 to 6.

(Supplemental Note 8)

The polarization demultiplexing optical communication system according to Supplemental Note 7, wherein the polarization demultiplexing optical communication transmitter includes
a frequency shift means which periodically changes a phase difference between the two optical signals, and
the polarization demultiplexing optical communication receiver includes:
an optical transmitter information input means which inputs information relating to the phase difference; and
a frequency shift compensation means which compensates for the phase difference between the two optical signals, based on the phase difference information input to the optical transmitter information input means, and based on a result of specifying the two optical signals.

(Supplemental Note 9)
The polarization demultiplexing optical communication system according to Supplemental Note 7 or 8, wherein
the frequency shift means adds a frequency deviation to at least one of the two optical signals so as to periodically change a phase difference between the two optical signals.

(Supplemental Note 10)
The polarization demultiplexing optical communication system according to any one of Supplemental Notes 7 to 9, wherein
the polarization demultiplexing optical communication receiver includes:
a local light generation means which generates local light;
a polarization separation means which causes interference between the local light and the multiplexed two optical signals for the polarization separation; and
a frequency deviation compensation means disposed posterior to the frequency shift compensation means, and configured to compensate for a frequency deviation between the local light and the two optical signals.

(Supplemental Note 11)
A polarization demultiplexing optical communication method, in which two optical signals whose polarization states are orthogonal to each other and whose frequency bands of carrier waves are the same as each other are multiplexed for transmission, and the multiplexed two optical signals are received for polarization separation, including:
imparting a signal quality change to the received multiplexed two optical signals; and
comparing signal qualities of the two optical signals with each other after the multiplexed two optical signals imparted with the signal quality change are subjected to the polarization separation so as to specify the two optical signals based on a result of the comparison.

(Supplemental Note 12)
The polarization demultiplexing optical communication method according to Supplemental Note 11, wherein
imparting the signal quality change is performed by a filter circuit.

(Supplemental Note 13)
The polarization demultiplexing optical communication method according to Supplemental Note 12, wherein
the filter circuit has a filter coefficient such that a center frequency of one of the two optical signals is a filter center frequency, and an optical spectral bandwidth of the one optical signal is a filter bandwidth.

(Supplemental Note 14)
The polarization demultiplexing optical communication method according to any one of Supplemental Notes 11 to 13, wherein
imparting the signal quality change is performed after the polarization separation is stabilized.

(Supplemental Note 15)
The polarization demultiplexing optical communication method according to any one of Supplemental Notes 11 to 14, wherein
imparting the signal quality change includes bypassing the optical signals after the two optical signals are specified.

(Supplemental Note 16)
The polarization demultiplexing optical communication method according to any one of Supplemental Notes 11 to 15, wherein
comparing the signal qualities is performed by a cost of an algorithm for the polarization separation.

This application claims the priority based on Japanese Patent Application No. 2013-008900 filed on Jan. 22, 2013, and all of the disclosure of which is hereby incorporated.

INDUSTRIAL APPLICABILITY

The invention is usable as a technique for implementing an ultra-high-speed long-distance optical communication system capable of handling a rapid increase in the traffic amount of a backbone network due to the spread of the Internet.

REFERENCE SIGNS LIST

10 Polarization demultiplexing optical communication receiver
11 Signal quality change imparting means
12 Signal quality monitoring means
100 Optical transmitter
101 Laser oscillator
102-1, 102-2 Frequency shifter
103-1, 103-2 Optical phase modulator
104-1, 104-2 Drive signal generator
105 Polarization multiplexing unit
200, 300, 400 Optical receiver
201 90-degree optical hybrid
202-1, 202-2, 202-3, 202-4 Optical detector
203-1, 203-2, 203-3, 203-4 ADC (Analog-to-Digital Converter)
204 Polarization separation unit
205 Frequency shift compensation unit
206-1, 206-2 Optical carrier wave frequency deviation/optical phase deviation compensation unit
207-1, 207-2 Symbol identification unit
208 Optical transmitter information input interface
209 Control unit
210 Signal quality change imparting unit
211 Signal quality monitoring unit
212 Local light oscillation unit

The invention claimed is:
1. A polarization demultiplexing optical communication receiver for receiving multiplexed two optical signals whose polarization states are orthogonal to each other and whose frequency bands of carrier waves are the same as each other for polarization separation, comprising:
hardware, including a processor and memory;
a signal quality change imparter implemented at least by the hardware and which imparts a signal quality change to the multiplexed two optical signals; and
a signal quality monitor implemented at least by the hardware and which compares signal qualities of the two optical signals with each other after the multiplexed two optical signals imparted with the signal quality change are subjected to the polarization separation so as to specify the two optical signals based on a result of the comparison.

2. The polarization demultiplexing optical communication receiver according to claim 1, wherein
the signal quality change imparter is a filter circuit.

3. The polarization demultiplexing optical communication receiver according to claim 2, wherein
the filter circuit has a filter coefficient such that a center frequency of one of the two optical signals is a filter center frequency, and an optical spectral bandwidth of the one optical signal is a filter bandwidth.

4. The polarization demultiplexing optical communication receiver according to claim 1, wherein
the signal quality change imparter imparts the signal quality change after the polarization separation is stabilized.

5. The polarization demultiplexing optical communication receiver according to claim 1, wherein
the signal quality change imparter bypasses the optical signals after the signal quality monitor specifies the two optical signals.

6. A polarization demultiplexing optical communication system, comprising:
a polarization demultiplexing optical communication transmitter which multiplexes two optical signals whose polarization states are orthogonal to each other and whose frequency bands of carrier waves are the same as each other for transmission; and
a polarization demultiplexing optical communication receiver which receives the multiplexed two optical signals for polarization separation, wherein
the polarization demultiplexing optical communication receiver is the polarization demultiplexing optical communication receiver according to claim 1.

7. The polarization demultiplexing optical communication system according to claim 6, wherein the hardware is first hardware, and
the polarization demultiplexing optical communication transmitter comprises
second hardware, including a second processor and second memory;
a frequency shifter implemented at least by the second hardware and which periodically changes a phase difference between the two optical signals, and
the polarization demultiplexing optical communication receiver comprises:
an optical transmitter information inputter implemented at least by the hardware and which inputs information on the phase difference; and
a frequency shift compensator implemented at least by the hardware and which compensates for the phase difference between the two optical signals, based on the phase difference information input to the optical transmitter information inputter, and based on a result of specifying the two optical signals.

8. The polarization demultiplexing optical communication system according to claim 6, wherein
the frequency shifter adds a frequency deviation to at least one of the two optical signals so as to periodically change a phase difference between the two optical signals.

9. The polarization demultiplexing optical communication system according to claim 6, wherein
the polarization demultiplexing optical communication receiver comprises:
a local light generation unit generator implemented at least by the hardware and which generates local light;
a polarization separator implemented at least by the hardware and which causes interference between the local light and the multiplexed two optical signals for the polarization separation; and
a frequency deviation compensator implemented at least by the hardware and disposed posterior to the frequency shift compensator, and configured to compensate for a frequency deviation between the local light and the two optical signals.

10. The polarization demultiplexing optical communication receiver according to claim 1, wherein
the signal quality monitor compares the signal qualities with each other by a cost of an algorithm for the polarization separation.

11. A polarization demultiplexing optical communication method of a polarization demultiplexing optical communication system, comprising:
receiving multiplexed two optical signals by a polarization demultiplexing optical communication receiver of the system from a polarization demultiplexing optical communication transmitter of the system, the two optical signals having polarization states orthogonal to each other and have frequency bands of carrier waves that are the same as each other;
imparting a signal quality change to the received multiplexed two optical signals by the polarization demultiplexing optical communication receiver;
subjecting the two optical signals imparted with the signal quality change to polarization separation by the polarization demultiplexing optical communication receiver; and
comparing signal qualities of the two optical signals with each other after the multiplexed two optical signals imparted with the signal quality change are subjected to the polarization separation so as to specify the two optical signals based on a result of the comparison by the polarization demultiplexing optical communication receiver.

12. The polarization demultiplexing optical communication method according to claim 11, wherein
imparting the signal quality change is performed by a filter circuit.

13. The polarization demultiplexing optical communication method according to claim 12, wherein
the filter circuit has a filter coefficient such that a center frequency of one of the two optical signals is a filter center frequency, and an optical spectral bandwidth of the one optical signal is a filter bandwidth.

14. The polarization demultiplexing optical communication method according to claim 11, wherein
imparting the signal quality change by the polarization demultiplexing optical communication receiver is performed after the polarization separation is stabilized.

15. The polarization demultiplexing optical communication method according to claim 11, wherein
imparting the signal quality change by the polarization demultiplexing optical communication receiver includes bypassing the optical signals after the two optical signals are specified.

16. The polarization demultiplexing optical communication method according to claim 11, wherein
comparing the signal qualities is performed by a cost of an algorithm for the polarization separation.

* * * * *